United States Patent [19]

Feldsted

[11] Patent Number: 4,466,760
[45] Date of Patent: Aug. 21, 1984

[54] MOBILE MATERIAL HANDLER AND A METHOD FOR TRANSFERRING BULK MATERIAL

[75] Inventor: Robert J. C. Feldsted, King County, Wash.

[73] Assignee: Premier Pneumatics, Inc., Shawnee Mission, Kans.

[21] Appl. No.: 367,371

[22] Filed: Apr. 12, 1982

[51] Int. Cl.³ .......................................... B65G 53/28
[52] U.S. Cl. ..................................... 406/41; 406/109; 406/152; 37/59; 414/305
[58] Field of Search .................... 406/38, 39, 41, 121, 406/122, 131, 136, 141, 151, 152, 153, 109, 33, 23, 24, 25, 15, 16, 14, 30, 32; 414/305, 306, 332, 608; 37/59

[56] References Cited

U.S. PATENT DOCUMENTS

| | | | |
|---|---|---|---|
| 2,669,488 | 2/1954 | Snow | 406/39 |
| 3,232,457 | 2/1966 | Bernstein et al. | 414/305 |
| 3,758,163 | 9/1973 | Kalisiak | 406/152 |
| 4,118,075 | 10/1978 | Lübbehusen | 406/131 |
| 4,168,864 | 9/1979 | Weeks | 406/23 |

Primary Examiner—Jeffrey V. Nase
Assistant Examiner—Daniel R. Edelbrock
Attorney, Agent, or Firm—Schmidt, Johnson, Hovey & Williams

[57] ABSTRACT

The present invention relates to a mobile material handler useful for transferring dry, powdered, bulk material from a flat surface to a truck load-out bin, a silo, or another receptacle. More particularly, the invention relates to a mobile material handler having fluidizing means to aerate and to fluidize the material which is received in an open end of the frame of the material handler. The fluidized material flows to the inlet means of a vacuum-pressure pneumatic conveyor which is also mounted to the frame. In a bulk material warehouse and transfer system, material is stored on the generally planar floor of a large warehouse. Within the warehouse, a mobile material handler is moved to transfer dry, bulk, powdered material from the warehouse to a remote truck load-out bin or other receptable. The present invention also relates to an improved vacuum-pressure pneumatic conveyor using a damper to improve discharge of the material from the storage vessel of the pneumatic conveyor and to methods of transferring dry, powdered, bulk material.

2 Claims, 9 Drawing Figures

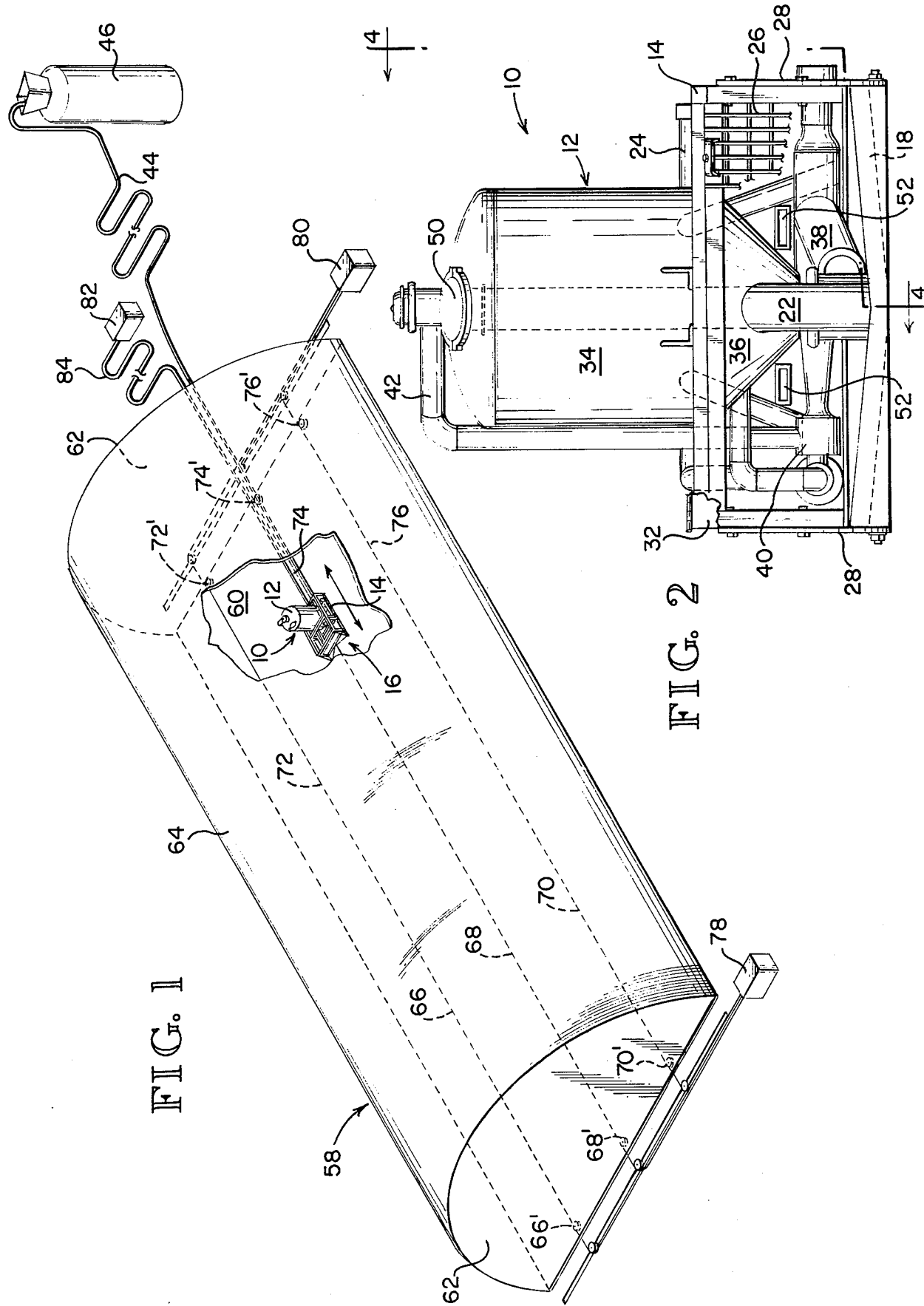

MOBILE MATERIAL HANDLER AND A METHOD FOR TRANSFERRING BULK MATERIAL

DESCRIPTION

1. Technical Field

The present invention relates to a mobile material handler useful for transferring dry, powdered, bulk material from a flat surface to a truck load-out bin, a silo, or another receptacle. More particularly, the invention relates to a mobile material handler having fluidizing means to aerate and to fluidize the material which is received in an open end of the frame of the material handler. The fluidized material flows to the inlet means of a vacuum-pressure pneumatic conveyor which is also mounted to the frame. The present invention also relates to an improved vacuum-pressure pneumatic conveyor using a damper to improve discharge of the material from the storage vessel of the pneumatic conveyor and to methods of transferring dry, powdered, bulk material.

2. Background Art

Ordinarily, bulk materials are stored in elevated silos or hoppers which are designed for gravity discharge. Silos of this design or alternative storage devices are relatively expensive. In flat-bottom, ground level storage units, for example, it is necessary to incorporate tunnels below the floor and to use screw conveyors or other expensive unloading devices to transfer the bulk material out of the tunnels to a warehouse. Even with predesigning of sophisticated equipment, storage and transfer costs for storing bulk material on flat surfaces is high.

When bulk material is stored on flat surfaces, dust problems occur if front end loaders are used to transfer the material. Workers are presented with serious and discouraging health and safety problems. The dust creates extreme mechanical maintenance problems as well and results in lost time when equipment is being repaired.

Commercially available mobile material handlers are not ordinarily designed to deal with the large volumes of material which are stored in bulk. While transfer could be made with the vacuum nozzles, the transfer would be a tedious process. Also, at least one operator would have to be within the bulk material storage warehouse and would be exposed to the health problems of residual dust entrained in the air or an avalanche of the large piles. For large volumes, then, improvements are desirable.

DISCLOSURE OF INVENTION

The mobile material handler of this invention solves the problems associated with storage and transfer of large amounts of dry, powdered, bulk materials. A vacuum-pressure pneumatic conveyor is mounted on a special frame so that the pneumatic conveyor can transfer the material from a hopper on the frame to a truck load-out bin. Fluidizing means at the leading edge of the hopper allow the mobile material handler to be wedged into a pile of material, to aerate the material so that it flows to the inlet of the pneumatic conveyor, and to transfer the material with the pneumatic conveyor to a suitable receiving receptacle. Dust generation in operating the mobile material handler is reduced because the pile of material is disrupted as little as possible during the transfer. Material falls into the hopper, where the pneumatic conveyor sucks it into a storage pressure vessel. During pressurized discharge, the material flows from the storage pressure vessel to a receiving receptacle. Few moving parts are involved in the system because the vacuum-pressure pneumatic conveyor operates completely from a source of compressed air. In a preferred transfer system, workers need not enter the storage warehouse during the transfer because the mobile material handler of this invention is pulled within the warehouse by a system of cables. The system works inexpensively and greatly reduces health and safety risks.

BRIEF DESCRIPTION OF THE DRAWINGS

FIG. 1 is a schematic isometric of a bulk material warehouse and transfer system according to this invention.

FIG. 2 is a front view of a mobile material handler.

BEST MODE FOR CARRYING OUT THE INVENTION

Figure 3:
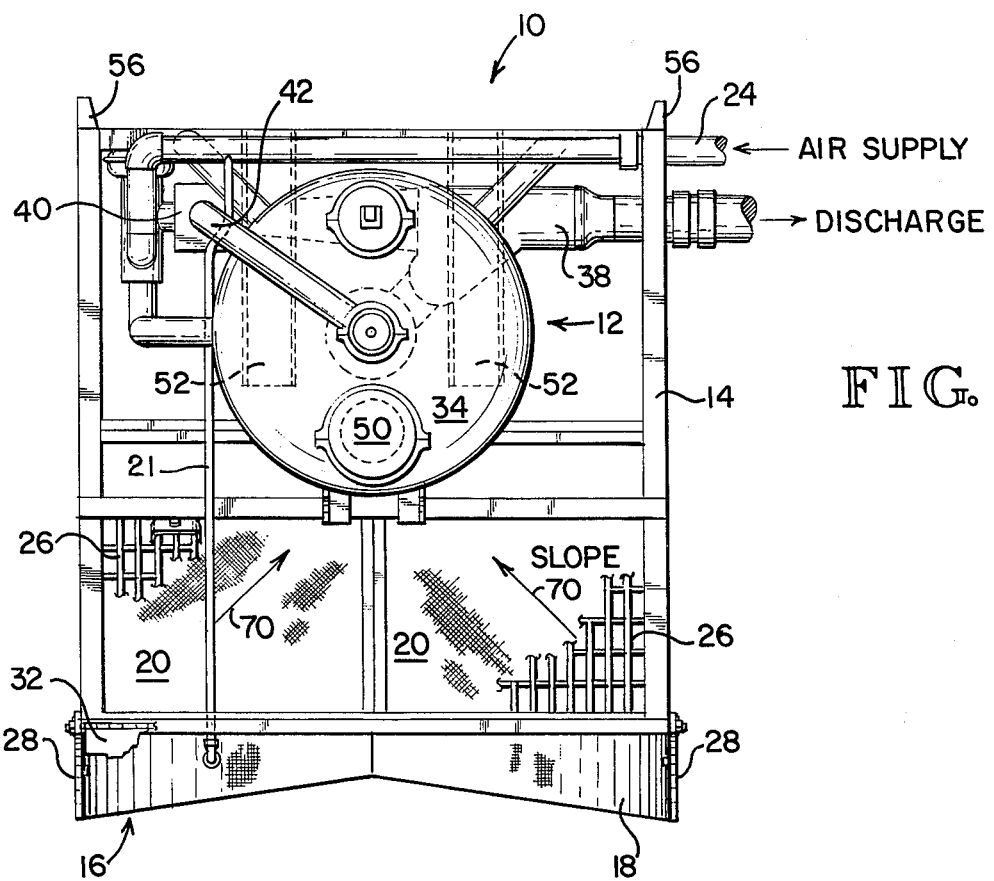
FIG. 3 is a top plan view of the mobile material handler of FIG. 2.

To organize and to simplify understanding of the mobile material handler, the material transfer system, and the method for transferring bulk material, this description will first discuss the mobile material handler; second, the bulk material warehouse and transfer system; third, an alternative vacuum-pressure pneumatic conveyor, including a novel damper, and fourth, the method for transferring bulk material using a mobile material handler.

(A)

A Mobile Material Handler

As best seen in FIGS. 2, 3, 4, and 5, a preferred mobile material handler 10 includes a vacuum-pressure pneumatic conveyor 12 mounted on a loader frame 14. The frame 14 has a generally open end to receive the dry, powdered, bulk material from a pile. A generally wedge-shaped nose cone 16 spans the open end of the frame 14 and is capable of wedging into the pile of material under the material. The nose cone 16 comprises a forward, upwardly slanting, porous, stainless steel wedge 18. A downwardly sloping fabric aeration means 20 is positioned immediately behind the wedge 18. When wedged into a pile of material, the nose cone 16 functions to aerate the material so that the material will flow inwardly toward the inlet means 20 of the vacuum-pressure pneumatic conveyor 12. Compressed air is provided through a line 21 below the porous, stainless steel wedge 18 and fabric aeration means 20 through air supply line 24. The air is forced upwardly through the nose cone 16 and through the material on the nose cone 16 to fluidize the material. Once fluidized, the material will flow by gravity downwardly upon the sloped surfaces of the fabric aeration means 20 toward the inlet means 22 of the pneumatic conveyor 12.

The open end of the frame 14 may include a slanted grate 26 which ensures that the material received in the open end of the frame 14 immediately above the aeration fabric 20 is essentially free of lumps and, therefore, is relatively easy to fluidize.

To better define the open end of the frame 14, triangular side panel plates 28 are mounted on either side of the frame 14 to extend from the wedge 18 toward the top of the frame 14. Similarly, plates 30 are included along the sides of the frame 14 adjacent the fabric aeration means 20 to define an essentially closed hopper in the open end of the frame 14. This enclosed hopper is particularly desirable when the mobile material handler includes a hinged and pivotable gate 32 (FIG. 4) positionable in at least two positions above the nose cone 16. In a first position, the gate 32 is positioned at the open end of the frame 14 to effectively close the open end while allowing the dumping of material into the hopper of the frame 14 from above. That is, the gate 32 forms a substantially vertical end wall for the hopper. In a second position, the gate 32 is positioned above the fabric aeration means 20 of the mobile material handler 10 to allow loading of material through the open end of the frame 14. That is, in the second position, the gate 32 forms a substantially horizontal ceiling above the fabric aeration means 20 of the frame 14.

Several vacuum-pressure pneumatic conveyors 12 are described in U.S. Pat. Nos. 4,168,864; 3,861,830; and 3,372,958. Apart from the patented vacuum-pressure pneumatic conveyors, the applicant is also aware of Halliburton Service's pull/push unloader, as described in the Halliburton brochure "Pneumatic Conveying Systems" at page 22. These disclosures are incorporated by reference into this description to supplement the disclosure.

Generally, a vacuum-pressure pneumatic conveyor 12 includes an inlet means 22, which generally is a substantially vertical pipe, that is used to suck fluidized material into a storage vessel 34. A flapper valve 36 allows closing of the inlet means 22 during a discharge cycle of the pneumatic conveyor 12. The storage vessel 34 has a generally conical lower portion 36 which acts as a funnel for material stored within the storage vessel 34. Centrally disposed in the bottom of the conical portion 36 is a discharge opening 38 forming an outlet means for the pneumatic conveyor 12. As described in U.S. Pat. No. 4,168,864, valves within the pneumatic conveyor 12 alternate the cycling of the pneumatic conveyor 12. In a loading cycle, a negative pressure is created within the storage vessel 34 by passing compressed air through air supply line 24 past a venturi assembly 40. The venturi assembly 40 causes to air to be sucked through line 42 from the storage vessel 34, thereby creating a negative pressure within the storage vessel 34. The suction of air from the storage vessel 34 causes the flapper valve 36 to lift and a suction is created throughout the inlet means 22. If a dry, powdered, bulk material is situated at the base of the inlet means 22, the suction created within the inlet means 22 will cause the fluidized material to be lifted into the storage vessel 34. During the discharge cycle, pressurized air enters the storage vessel 34 through compressed air line 24 to carry stored material within the storage vessel 34 out the discharge opening 38 and through suitable conduit means 44 to a receiving receptacle 46 (FIG. 1). Automatic cycling between the loading and discharge cycles is provided by suitable switching sensors located within the storage vessel 34. A first sensor is responsive to the level of the material in the storage vessel 34 and is capable of switching the vacuum-pressure pneumatic conveyor 12 from the loading cycle to the discharge cycle when a predetermined level of material is reached in the storage vessel 34. A second sensor is responsive to the pressure in the storage vessel 34 and is capable of switching from the discharge cycle to the loading cycle when a predetermined pressure is attained within the storage vessel 34. Usually, the pneumatic conveyor 12 is set to shift between the discharge cycle and the loading cycle when the pressure within the storage vessel 34 drops to about 6 psi. If there is a significant delay between the drop-off of conveying pressure and the shift to vacuum, a shift pressure adjuster (not shown) allows resetting of the shift pressure. Adjustment may be necessary to ensure that the shift to the discharge cycle and return to vacuum do not occur prematurely and so that the storage vessel 34 is essentially emptied during the discharge cycle.

Compressed air supply line 24 preferably includes a pressure relief valve (not shown) to ensure that the pressure within the storage vessel 34 never exceeds a predetermined pressure. A handhole 50 allows access to the interior of the storage vessel 34 for cleaning or other repairs.

Figure 5:
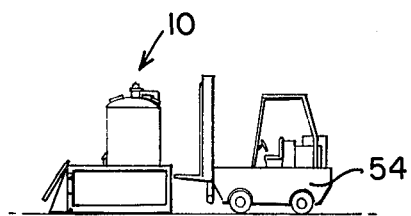
FIG. 5 is a schematic of the mobile material handler attached to a forklift or another automotive vehicle for moving the material handler.
Figure 4:
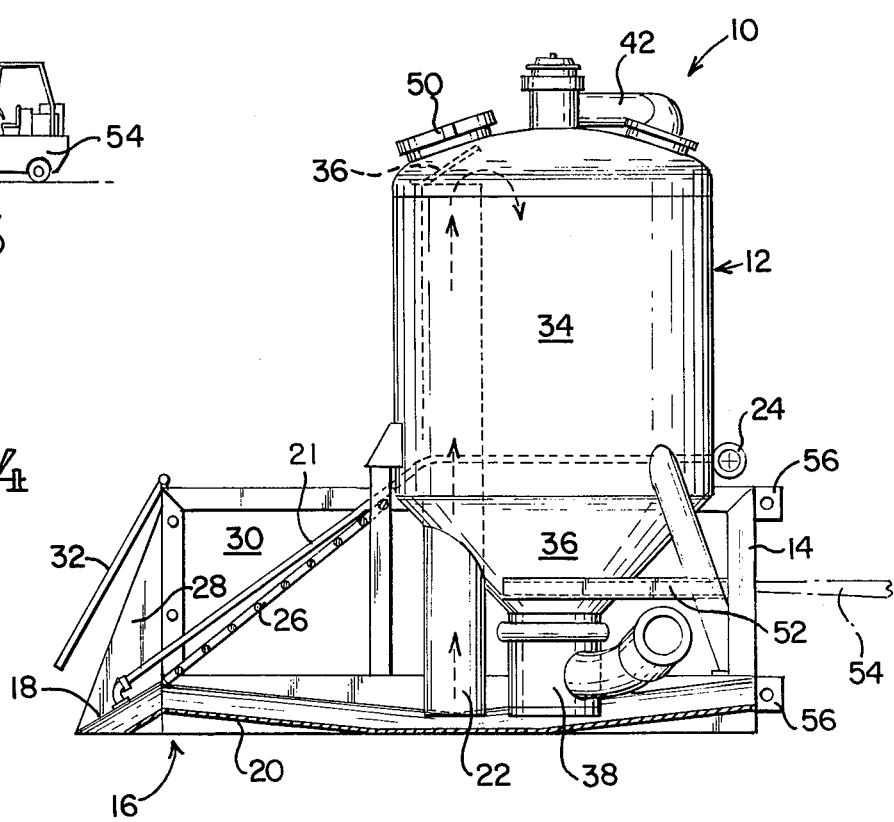
FIG. 4 is a side elevation of the mobile material handler of FIG. 2, partially cut away, as shown by line 4—4 of FIG. 2.
Figure 6:
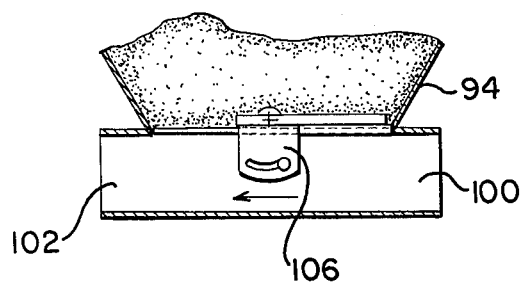
FIG. 6 is a detailed view of a damper on the discharge of a vaccuum-pressure pneumatic conveyor.

The frame 14 may include forklift slots 52 to receive the tines of a forklift 54, as schematically illustrated in FIG. 5. Lugs 56 may be used to fasten the forklift 54 to the mobile material handler 10 or may be used to fasten a front end loader (not shown) or another automotive vehicle to the frame 14 of the mobile material handler 10.

Use of a conical bottom portion 36 for the storage vessel 34 allows the elimination of the aeration fabric within the storage vessel 34, as was described and claimed in U.S. Pat. No. 4,168,864.

(B)

A Bulk Material Warehouse and Transfer System

The mobile material handler 10 of this invention perhaps is best used in a novel bulk material warehouse and transfer system. As shown in FIG. 1, a warehouse of the quonset-hut type 58 has a generally planar floor 60, end walls 62, and a central curving roof portion 64 defining a generally closed geometric solid. Dry, powdered, bulk material is conveniently stored on the floor within the relatively large volume of the warehouse 58. A plurality of cables 66, 68, 70, 72, 74, and 76 extend through access openings 66', 68', 70', 72', 74', and 76' and traverse the floor 60 of the warehouse 58. As shown for the central column (made up of cable 68 and cable 74), the mobile material handler 10 of this invention is clamped on the front and rear to the cables 68 and 74. One cable 68 is attached to the front end of the mobile material handler and is capable of hauling the material handler 10 forward so that the open end of the material handler 10 will contact piles of material (not shown) within the warehouse 58 and will be able to transfer the material from the warehouse 58 through a conduit 44, such as a flexible fabric hose or other suitable pipe, to a suitable receptacle 46, such as a truck load-out bin.

As shown in FIG. 1, a hydraulic winch 78 is positioned outside the warehouse 58 to draw in cable 68 and to pull the material handler 10 from right to left across the floor 60 of the warehouse 58. Simultaneously, a hydraulic winch 80 will pay out cable 74 to allow the steady movement of the material handler 10. When the material handler 10 reaches the left end wall 62 of the warehouse 58, the second hydraulic winch 80 will reel in cable 74 and will return the material handler 10 to its original position. Only at this time need workers enter the warehouse 58. Then, the workers will move the material handler 10 to another cable system (for example, either the column comprised of cables 66 and 72 in FIG. 1 or the column comprised of cables 70 and 76), and will leave the warehouse before additional material is transferred. The cable columns are arranged so that the mobile material handler 10 may be hauled over substantially the entire surface area of the floor 60 of the warehouse 58. Preferably, the cable pairs which form columns are independently operable through separate hydraulic winches or other cable systems.

For the mobile material handler 10 to be activated while being hauled along the floor 60 of the warehouse 68, a source of compressed air 82 is coupled to the material handler 10 through suitable conduit 84. The source of compressed air 82 supplies air to the nose cone 16 of the mobile material handler 20 and the vacuum-pressure pneumatic conveyor 12.

In operation, then, the bulk material warehouse and transfer system optimizes transfer of dry, powdered, bulk materials by allowing inexpensive construction of a storage warehouse and dependable transfer without serious health and safety risks. Most mechanical equipment is located outside the warehouse 58, away from any dust. Transfer of material may be conducted without workers being exposed to dust within the warehouse 58.

(C)

An Improved Pneumatic Conveyor, Including a Novel Damper

Figure 7:
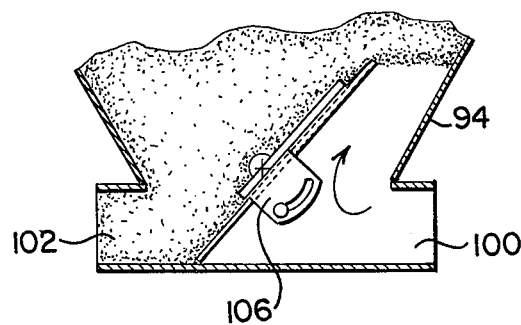
FIG. 7 is another detailed view of the damper of FIG. 6.
Figure 8:
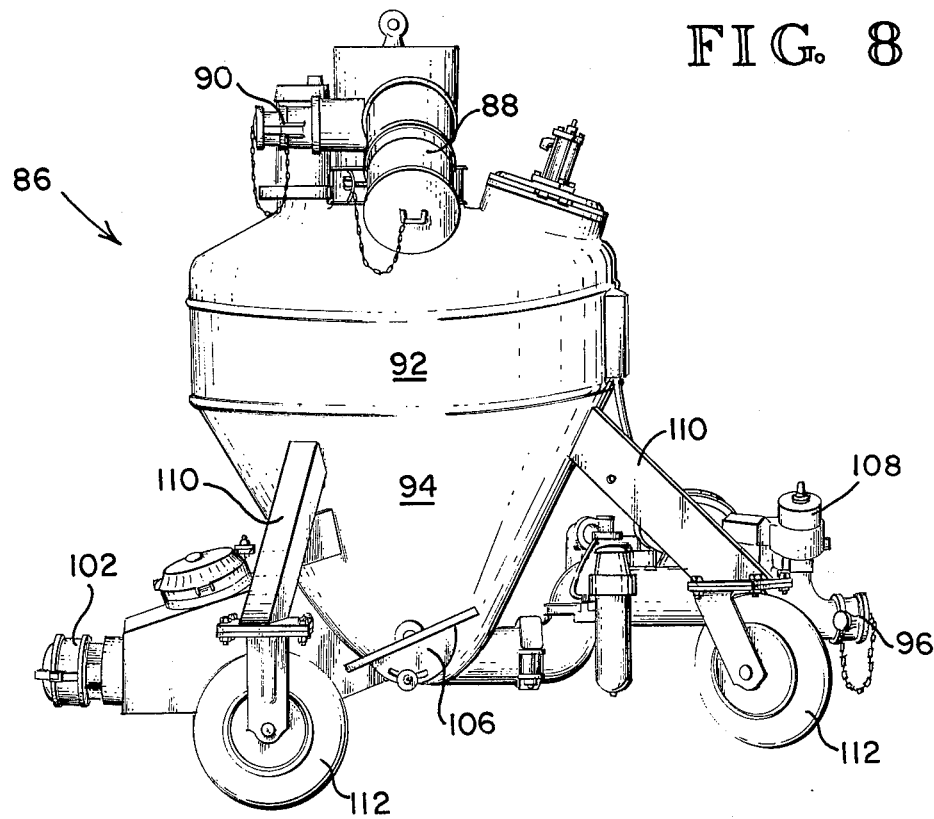
FIG. 8 is a side elevation of an alternate vacuum-pressure pneumatic conveyor useful on the mobile material handler of this invention.
Figure 9:
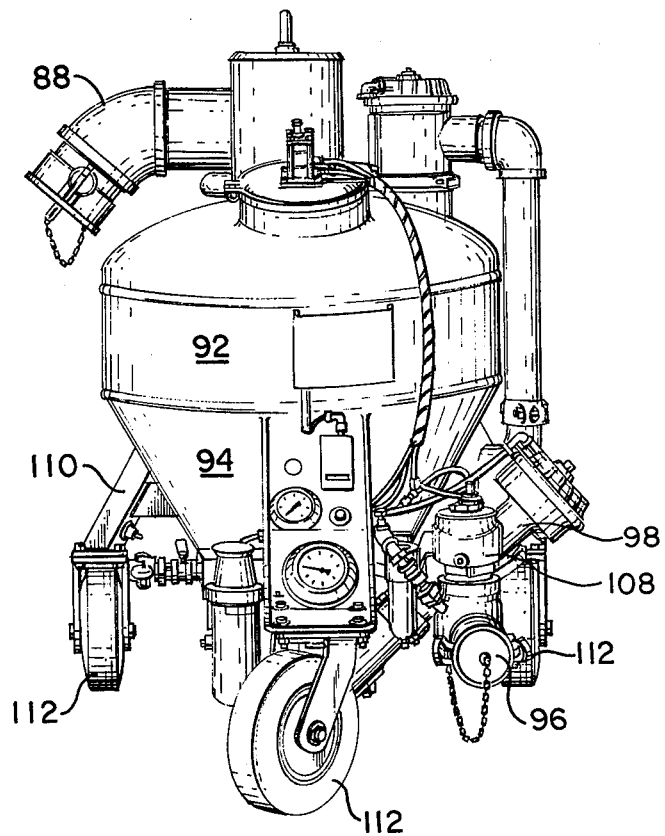
FIG. 9 is a front view of the pneumatic conveyor of FIG. 8.

As shown in FIGS. 6, 7, 8, and 9, an improved vacuum-pressure pneumatic conveyor 86 may be used with the mobile material handler 10 of this invention. The pneumatic conveyor 86 includes a storage vessel 92 having two product inlet lines 88 and 90. One product inlet line 88 is a large-diameter conduit, while the other inlet means 90 is a smaller diameter conduit. Selection between lines 88 or 90 depends upon the quantity of material and the velocity of flow desired in the line. Material will be fluidized and will travel in plug flow (i.e., low velocity, dense phase, high pressure drop flow) through the conduit under the suction created during operation of the pneumatic conveyor 86. Abrasion of the conduit is a function of the velocity within the line and is the critical factor in selecting the proper inlet line 88 or 90. Compressed air enters the pneumatic conveyor 86 through line 96 and passes through a main control valve assembly 98 and then through a nozzle and venturi assembly (not shown), thereby generating a negative pressure during a filling cycle. After the storage vessel is filled, the main control valve assembly 98 shifts to direct the compressed air through line 100 to connect with discharge line 102. Compressed air is directed from line 100 into the storage vessel 92 by a damper 106, which may be manually set at a plurality of positions varying the amount of compressed air which enters the storage vessel 92. In the fully closed position shown in FIG. 6, compressed air flows straight through line 100 into discharge line 102, with little or no product being fed from the storage vessel 92 into the discharge line 102. When handling free-flowing, granular material, such as sand, it is best to start with the damper 106 in the fully closed position. When the pneumatic conveyor 86 shifts to the discharge cycle, it is best to manually open the damper a small amount and to watch the conveying pressure generated as a consequence. If the pressure begins to climb fast, it is best to close the damper 106 a small amount. If the relief valve 108 blows because of the pressure increase, the damper 106 is closed fully, time is allowed for the discharge line 102 to clear, and discharge of the material from the storage vessel 92 is begun by opening the damper 106 a small amount. In the fully open position, the damper 106 directs compressed air into the storage vessel 92 to mix with the product and to provide maximum discharge of the product through discharge line 102. For most fine, fluidizable powders, the damper 106 will be set in the fully open position, as shown in FIG. 7. Peak conveying pressure should be a few psi below the maximum compressor pressure available. The combination of the conical bottom portion 94 of the storage vessel 92 and the damper 106 obviates the need for use of an aeration fabric within the storage vessel of the pneumatic conveyor 86.

Generally, the damper 106 is a pivotally mounted, circular plate which functions much like a butterfly valve.

As with other pneumatic conveyors, the improved pneumatic conveyor 86 includes a switching means sensitive to the level of material within the storage vessel 92 during loading and to the pressure of compressed air within the storage vessel 92 during discharging. A more complete description of the operation and function of a preferred pneumatic conveyor 86 is included in the Users' Manual for the Vack II pneumatic conveyor sold by the AirKonvey Company of Seattle, Wash. This Users' Manual is incorporated by reference into this description, including all photographs and written description.

The pneumatic conveyor 86, including a damper 106, may be used apart from the mobile material handler 10. Therefore, in one embodiment, the pneumatic conveyor 86 includes spaced support arms 110 to position wheels 112 so that the pneumatic conveyor 86 may be easily rolled around.

(D)

A Method for Transferring Dry, Bulk, Powdered Material

The mobile material handler 10 of this invention uses a novel method to transfer dry, bulk, powdered material from a pile or the like to a truck load-out bin, a silo, or another receptacle. While vacuum nozzles have generally been used to collect material from a pile, the mobile material handler 10 of this invention allows a frame 14 to be wedged into a pile to catch material in a hopper of the frame 14. Fluidizing the material in the hopper causes the material to flow to the inlet means 22 of a vacuum-pressure pneumatic conveyor 12, where the material is sucked into the storage vessel 34 of the pneumatic conveyor 12 and subsequently discharged to a desired receptacle 46. The method of this invention is beneficial when conveying large amounts of bulk, dry material. If the mobile material handler 10 has means for affixing a forklift to the frame 14, the frame 14 may be hoisted so that the material handler 10 can attack the pile at an intermediate height rather than from the floor. In this way, the risk of avalanche of the pile is greatly reduced and the related problem of dust is similarly reduced.

Numerous materials can be conveyed with the pneumatic conveyor 86 and material handler 10 of this invention. Essentially any material that may be fluidized can be conveyed, including adipic acid, agline, albacar, alumina, antomite, arsenic, asbestos fibers, barites, bauxite, bentonite, borax, calcium carbonate, calcium chloride, cement, Portland cement, clay, coke, powdered copper, diatomaceous earth, dolomite, feldspar, ferrite powder, fertilizers, flint, flour, fly ash, gilsonite, gypsum, haydite, hydrol, iron oxide, kiln dust, lime, limestone dust, magnesium, pebble lime, phosphates, potash, pozzolan, pumice, polyvinyl chloride powder, quartz dust, salt cake, sand, shale, expanded shale, soda ash, silica flour, sodium sulfate, starch, strontium carbonate, sugar, synenite, urea, or zinc oxide. These materials and others are listed in the BHRA Fluid Engineering, Pneumotransport 4, Vol. 1, of the Fourth International Conference on the Pneumatic Transport of Solids in Pipes, June 26-28, 1978, at pp. D3-47 and D3-48 (incorporated by reference into this description).

I claim:

1. A mobile material handler to transfer dry, bulk, powdered material from a pile or the like to a truck load-out bin, a silo, or another receptacle, comprising:
   (a) a frame having a generally open end to receive the material;
   (b) a vacuum-pressure pneumatic conveyor mounted on the frame, and including an inlet means to receive the material in the open end of the frame and to convey the material to a storage vessel of the pneumatic conveyor and an outlet means exiting from the storage vessel;
   (c) fluidizing means to aerate and to fluidize the material which is received in the open end of the frame and to cause that material to flow to the inlet means of the pneumatic conveyor;
   (d) compressed air supply means to power the fluidizing means and the pneumatic conveyor; and
   (e) a conduit connected to the outlet means of the pneumatic conveyor to allow transfer of the material from the storage vessel to the receptacle,
   (f) the fluidizing means using the compressed air to aerate the material and including a porous mesh which allows compressed air to pass from the compressed air supply means upwardly through the material the porous mesh being a porous stainless steel aeration panel which is slanted downwardly away from the pneumatic conveyor to form a generally wedge-shaped nose cone away from the pneumatic conveyor and a fabric aeration means immediately behind the panel which is slanted downwardly toward the inlet means of the pneumatic conveyor.

2. A mobile material handler to transfer dry, bulk, powdered material from a pile or the like to a truck load-out bin, a silo, or another receptacle, comprising:
   (a) a frame having a generally open end to receive the material;
   (b) a vacuum-pressure pneumatic conveyor mounted on the frame, and including an inlet means to receive the material in the open end of the frame and to convey the material in the open end of the frame and to convey the material to a storage vessel of the pneumatic conveyor and an outlet means exiting from the storage vessel;
   (c) fluidizing means to aerate and to fluidize the material which is received in the open end of the frame and to cause that material to flow to the inlet means of the pneumatic conveyor;
   (d) compressed air supply means to power the fluidizing means and the pneumatic conveyor; and
   (e) a conduit connected to the outlet means of the pneumatic conveyor to allow transfer of the material from the storage vessel to the receptacle,
   (f) said frame including a generally wedge-shaped nose cone spanning the open end of the frame and being capable of wedging into the pile under the material, a hopper whose bottom is defined by the fluidizing means and which is located immediately behind the nose cone, being capable of holding the material when the frame moves into the pile and a pivotable gate which is secured to the frame generally above the nose cone, which is capable of being positioned in a first position at the open end of the frame to effectively close the open end while allowing the dumping of material into the hopper; in this first position, the gate forming a substantially vertical end wall for the hopper, and which is capable of being positioned in a second position above the fluidizing means to allow loading of material with the open end; in this second position, the gate forming a substantially horizontal ceiling above the fluidizing means.

* * * * *